J. CHILCOTT.
Extracting Oils.

No. 45,584.

Patented Dec. 27, 1864.

Witnesses:
Henry T. Brown
J. W. Coombs

Inventor:
John Chilcott

UNITED STATES PATENT OFFICE.

JOHN CHILCOTT, OF BROOKLYN, NEW YORK.

IMPROVED APPARATUS FOR MAKING EXTRACTS FROM ANIMAL AND VEGETABLE SUBSTANCES.

Specification forming part of Letters Patent No. 45,584, dated December 27, 1864; antedated December 20, 1864.

*To all whom it may concern:*

Be it known that I, JOHN CHILCOTT, of 70 Fulton street, in the city of Brooklyn, county of Kings, and State of New York, have invented a new and useful Improvement in Apparatus for Making Extracts from Animal and Vegetable Substances; and I do hereby declare that the following is a full, clear, and exact description of the same, reference being had to the accompanying drawings, forming part of this specification, in which—

Figure 1:
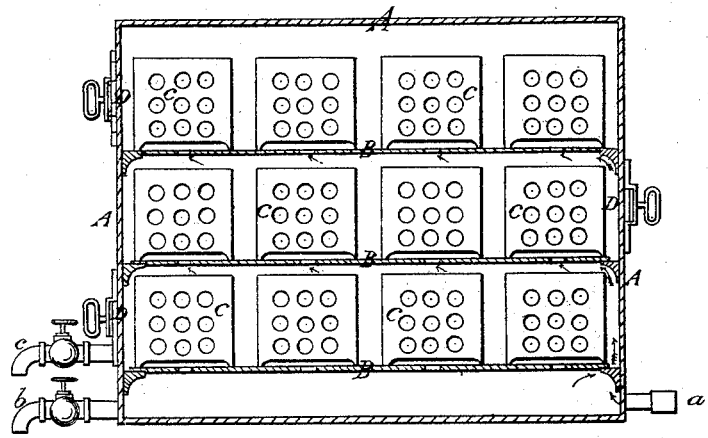
Figure 2:
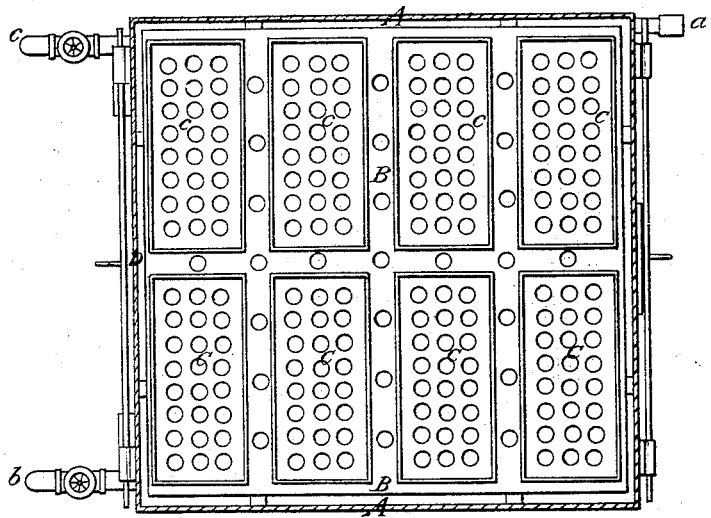

Figure 1 is a vertical section of my improved apparatus. Fig. 2 is a horizontal section of the same.

Similar letters of reference indicate corresponding parts in both figures.

This invention relates to apparatus for making extracts from animal and vegetable substances by the process of steaming, more especially to digesters for extracting grease and gelatine from the bones, hoofs, and other parts of animals; and it consists in providing the steaming vessel or digester with a series of open shelves or gratings, arranged one above another, and in the employment of baskets, arranged upon said shelves, to contain the matters from which the extracts are to be made, whereby I am enabled to obtain a more perfect distribution and circulation of the steam among, around, and through said matters, and to provide for the freer escape of the extracts, and thereby to effect the extraction more perfectly, rapidly, and economically.

To enable others skilled in the art to make and use my invention, I will proceed to describe its construction and operation.

A represents the steaming-chamber or digester, of any suitable form or capacity, and B B are shelves arranged one above another, at suitable distances apart. These shelves are perforated or grated, and do not extend quite to the sides of the vessel A, but have spaces left around them for the circulation of steam and the overflow of the gelatine and grease or other extracts from the matters under treatment.

C C are the baskets in which the matters to be treated are placed. These may be made of perforated sheet-iron or of iron rod or wire to permit the free circulation of steam through their sides and bottoms and the free escape of the grease and gelatine or other extracts, and as many as convenient are placed on each shelf, always leaving between them a sufficient space for the circulation of the steam. There is an opening or man-hole provided in one side of the vessel over each shelf for the insertion and removal of the baskets, said opening or man-holes being provided with a steam-tight door or man-lid, by which it is closed during the steaming operation.

The vessel A may be supplied with steam from a separate boiler, or steam may be generated from water contained in the vessel itself by a fire underneath. The drawings represent a steam-pipe, $a$, entering the vessel. Two pipes, $b$ $c$, are also represented, one, $b$, close to the bottom for drawing off the gelatine, and one, $c$, a little higher, for drawing off the grease, which floats upon the gelatine.

The operation is as follows: The bones or other matters to be treated should preferably be first broken, crushed, or cut up and placed in the baskets C C, which are then placed on the several shelves and the doors or man-lids are tightly closed. Steam is then generated in or admitted to the vessel A, and circulating around and through the shelves, around, between, and through the baskets and their contents, melts or dissolves the grease and gelatine or other substances to be extracted, which run off through the baskets and through and around the shelves, and are collected in the lower part of the vessel A, whence they are drawn off by the pipes $b$ and $c$. When the grease and gelatine or other substances have been thoroughly extracted from the contents of the baskets on the upper shelf, which will be known by a little experience of the operation, steam is shut off or allowed to subside, and the doors or man-lids are all opened. The baskets on the top shelf are then taken out and removed, those on the shelf next below are transferred to the top one, those on the other shelf or shelves to that or those immediately above, and baskets full of fresh matters placed on the lowest shelf, and the doors or man lids closed or replaced and secured, and the operation repeated. Repetitions of this operation may be performed for any length of time, the baskets on the lower shelves b ing transferred to those directly above, and the baskets of fresh material being placed on the lowest shelf.

By the arrangement of the matters to be treated in baskets upon a series of perforated or grated shelves, a much larger quantity of the matters may be operated upon at one time in a vessel of given capacity and by a given quantity of steam than when they are placed directly within the body of the vessel or in a basket occupying the whole, or nearly the whole, of the interior of the vessel.

I do not claim, broadly, the placing of matters from which extracts are to be made in a basket within a steaming-vessel or digester; but

What I claim as my invention, and desire to secure by Letters Patent, is—

The combination, within the steaming-vessel or digester A, of the series of open perforated or grated shelves B B, and the baskets C C, for containing the matters to be heated, arranged upon the said shelves, substantially as and for the purpose herein specified.

JOHN CHILCOTT.

Witnesses:
  HENRY T. BROWN,
  J. W. COOMBS.